United States Patent
Kitada et al.

(10) Patent No.: US 10,826,038 B2
(45) Date of Patent: Nov. 3, 2020

(54) SECONDARY BATTERY, BATTERY PACK, AND ELECTRIC VEHICLE

(71) Applicant: Sony Corporation, Tokyo (JP)

(72) Inventors: Keitaro Kitada, Kanagawa (JP); Takashi Fujinaga, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 166 days.

(21) Appl. No.: 13/974,848

(22) Filed: Aug. 23, 2013

(65) Prior Publication Data
US 2014/0072866 A1    Mar. 13, 2014

(30) Foreign Application Priority Data

Sep. 12, 2012 (JP) .................................. 2012-200497

(51) Int. Cl.
*H01M 2/16* (2006.01)
*H01M 10/052* (2010.01)
(Continued)

(52) U.S. Cl.
CPC .............. *H01M 2/168* (2013.01); *B60L 7/14* (2013.01); *B60L 15/2009* (2013.01); *B60L 50/51* (2019.02); *B60L 50/62* (2019.02); *B60L 50/64* (2019.02); *B60L 53/14* (2019.02); *B60L 53/63* (2019.02); *B60L 53/64* (2019.02); *B60L 53/65* (2019.02); *B60L 53/665* (2019.02); *B60L 55/00* (2019.02); *B60L 58/12* (2019.02); *B60L 58/21* (2019.02); *H01M 2/1653* (2013.01);
(Continued)

(58) Field of Classification Search
CPC ...................................................... H01M 2/168
See application file for complete search history.

(56) References Cited

U.S. PATENT DOCUMENTS 6,468,698 B1 * 10/2002 Hamano et al. .............. 429/316
6,660,435 B1 * 12/2003 Andrieu .............. H01M 2/1653
429/212
(Continued)

FOREIGN PATENT DOCUMENTS

JP    2004-179136    6/2004
JP    2010-257988    11/2010

OTHER PUBLICATIONS

Scientific & Technical Information Center (STIC) Search Results From Sam Darwish—File Name 13974848Nitro(004).pdf, Mar. 6, 2017.*

(Continued)

*Primary Examiner* — Victoria H Lynch
(74) *Attorney, Agent, or Firm* — Chip Law Group

(57) ABSTRACT

A secondary battery includes: a cathode and an anode opposed to each other with a separator in between; an electrolyte layer provided between the anode and the separator; and an adhesion layer provided between the anode and the electrolyte layer, wherein the anode includes an active material and a first polymer compound, the electrolyte layer includes an electrolytic solution and a second polymer compound, the adhesion layer includes a third polymer compound, the first polymer compound includes a polar group, the second polymer compound includes a polymer chain, and the third polymer compound includes a polar group and a polymer chain same as the polymer chain of the second polymer compound.

10 Claims, 5 Drawing Sheets

(51) Int. Cl.
*H01M 4/62* (2006.01)
*H01M 10/0565* (2010.01)
*B60L 15/20* (2006.01)
*B60L 7/14* (2006.01)
*B60L 58/21* (2019.01)
*B60L 50/62* (2019.01)
*B60L 53/64* (2019.01)
*B60L 53/66* (2019.01)
*B60L 50/64* (2019.01)
*B60L 53/14* (2019.01)
*B60L 53/63* (2019.01)
*B60L 53/65* (2019.01)
*B60L 50/51* (2019.01)
*B60L 58/12* (2019.01)
*B60L 55/00* (2019.01)
*H01M 10/0587* (2010.01)
*H01M 10/04* (2006.01)

(52) U.S. Cl.
CPC ......... *H01M 4/622* (2013.01); *H01M 10/052* (2013.01); *H01M 10/0565* (2013.01); *B60L 2200/12* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/662* (2013.01); *H01M 10/0431* (2013.01); *H01M 10/0587* (2013.01); *H01M 2220/20* (2013.01); *Y02E 60/122* (2013.01); *Y02E 60/721* (2013.01); *Y02T 10/6217* (2013.01); *Y02T 10/645* (2013.01); *Y02T 10/7011* (2013.01); *Y02T 10/7044* (2013.01); *Y02T 10/7061* (2013.01); *Y02T 10/7072* (2013.01); *Y02T 10/7077* (2013.01); *Y02T 10/7241* (2013.01); *Y02T 10/7275* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 2005/0130040 A1* | 6/2005 | Yang | H01M 4/133 429/217 |
| 2007/0111104 A1* | 5/2007 | Shibuya | H01M 4/139 429/303 |
| 2009/0202908 A1* | 8/2009 | Sumihara | H01M 4/13 429/218.1 |
| 2011/0008673 A1* | 1/2011 | Ugaji | H01M 4/134 429/188 |
| 2011/0159368 A1* | 6/2011 | Hirose et al. | 429/219 |
| 2011/0217589 A1* | 9/2011 | Kobayashi | H01M 2/02 429/174 |
| 2012/0052379 A1* | 3/2012 | Roh | H01M 4/13 429/211 |
| 2012/0150375 A1* | 6/2012 | Adachi | H01M 2/34 701/22 |
| 2012/0202103 A1* | 8/2012 | Yu | H01M 10/4257 429/144 |
| 2013/0059193 A1* | 3/2013 | Scordilis-Kelley | H01M 4/62 429/156 |
| 2014/0065489 A1* | 3/2014 | Saimen | H01M 4/622 429/303 |

OTHER PUBLICATIONS

Julien, Christian, Solid State Batteries: Materials Design and Optimization, Norwell: Kluwer Academic Publishers, 1994 (Year: 1994).*

* cited by examiner

SECONDARY BATTERY, BATTERY PACK, AND ELECTRIC VEHICLE

CROSS REFERENCES TO RELATED APPLICATIONS

The present application claims priority to Japanese Priority Patent Application JP 2012-200497 filed in the Japan Patent Office on Sep. 12, 2012, the entire content of which is hereby incorporated by reference.

BACKGROUND

The present application relates to a secondary battery including an electrolyte layer containing an electrolytic solution and a polymer compound, and to a battery pack and an electric vehicle that use the secondary battery.

In recent years, various electronic apparatuses such as a mobile phone and a personal digital assistant (PDA) have been widely used, and it has been demanded to further reduce the size and the weight of the electronic apparatuses and to achieve their long life. Accordingly, as an electric power source for the electronic apparatuses, a battery, in particular, a small and light-weight secondary battery capable of providing high energy density has been developed.

In these days, it has been considered to apply such a secondary battery to various other applications in addition to the electronic apparatuses. Examples of such other applications may include a battery pack attachably and detachably mounted on the electronic apparatuses or the like and an electric vehicle such as an electric automobile.

Secondary batteries utilizing various charge and discharge principles to obtain a battery capacity have been proposed. In particular, a secondary battery utilizing insertion and extraction of an electrode reactant has attracted attention, since these secondary batteries provide higher energy density than lead batteries, nickel-cadmium batteries, and the like.

Such a secondary battery utilizing insertion and extraction of an electrode reactant includes a separator and an electrolyte together with a cathode and an anode. The anode contains a binder and/or the like as necessary together with an active material capable of inserting and extracting the electrode reactant. As the electrolyte, an electrolytic solution as a liquid electrolyte is widely used. The electrolytic solution contains a solvent and an electrolyte salt.

As a package member containing the cathode, the anode, and the like, a rigid metal can is widely used. In these days, with flexibility paramount in thinking, a laminated film is also used. In association therewith, a gel electrolyte is adopted as an electrolyte. In the gel electrolyte, an electrolytic solution is held by a polymer compound, and therefore, liquid leakage is prevented, and adhesibility of the anode and/or the like with respect to a separator is improved.

For a configuration of the secondary battery, various studies have been made. Specifically, in order to improve charge and discharge cycle characteristics and the like, when silicon or the like is used as an anode active material, a polyether-based solid polymer or the like is used as a polymer in a solid electrolyte, and polyimide is used as a binder of the anode (for example, see Japanese Unexamined Patent Application Publication Nos. 2004-179136 and 2010-257988).

SUMMARY

In the secondary battery utilizing insertion and extraction of an electrode reactant that includes the gel electrolyte, the anode active material is easily expanded and shrunk at the time of charge and discharge. Therefore, according to such expansion and shrinkage level, cycle characteristics and the like as important characteristics of the secondary battery tend to be lowered.

Therefore, in order to suppress influence of such expansion and shrinkage of the active material, a physically-tough polymer compound such as polyimide may be used as a binder. However, since in general, the physically-tough polymer compound is less likely to be swollen with respect to a solvent in an electrolyte, the physically-tough polymer compound tends to be less likely to adhere to a polymer compound in the electrolyte. Therefore, when the active material is expanded and shrunk at the time of charge and discharge, an anode is easily peeled off from an electrolyte layer.

In order to prevent the anode from being peeled off from the electrolyte layer, as a binder, in addition to the foregoing physically-tough polymer compound such as polyimide, another polymer compound that is easily swollen with respect to the solvent may be used. However, in the case where part of the binder is swollen, due to a fact that binding of a polymer chain is released, physical strength (or mechanical strength) of the whole binder is lowered. Therefore, although the physically-tough polymer compound is used, expansion and shrinkage of the active material is less likely to be suppressed.

Accordingly, in the past, at the time of using the physically-tough polymer compound as a binder and the gel electrolyte as an electrolyte, a so-called trade-off in between has existed. That is, at the time of trying to suppress expansion and shrinkage of the active material, adhesibility of the anode with respect to a separator has been lowered. In contrast, at the time of tying to improve the adhesibility of the anode with respect to the separator, the active material is easily expanded and shrunk.

It is desirable to provide a secondary battery, a battery pack, and an electric vehicle that are allowed to balance suppressing expansion and shrinkage of an active material with improving adhesibility of an anode with respect to a separator.

According to an embodiment of the present application, there is provided a secondary battery including: a cathode and an anode opposed to each other with a separator in between; an electrolyte layer provided between the anode and the separator; and an adhesion layer provided between the anode and the electrolyte layer, wherein the anode includes an active material and a first polymer compound, the electrolyte layer includes an electrolytic solution and a second polymer compound, the adhesion layer includes a third polymer compound, the first polymer compound includes a polar group, the second polymer compound includes a polymer chain, and the third polymer compound includes a polar group and a polymer chain same as the polymer chain of the second polymer compound.

According to embodiment of the present application, there is provided a battery pack including: a secondary battery; a control section controlling a used state of the secondary battery; and a switch section switching the used state of the secondary battery according to an instruction of the control section, wherein the secondary battery includes a cathode and an anode opposed to each other with a separator in between, an electrolyte layer provided between the anode and the separator, and an adhesion layer provided between the anode and the electrolyte layer, and wherein the anode includes an active material and a first polymer compound, the electrolyte layer includes an electrolytic solution and a second polymer compound, the adhesion layer includes a third polymer compound, the first polymer compound includes a polar group, the second polymer compound includes a polymer chain, and the third polymer compound includes a polar group and a polymer chain same as the polymer chain of the second polymer compound.

According to embodiment of the present application, there is provided an electric vehicle including: a secondary battery; a conversion section converting electric power supplied from the secondary battery into drive power; a drive section operating according to the drive power; and a control section controlling a used state of the secondary battery, wherein the secondary battery includes a cathode and an anode opposed to each other with a separator in between, an electrolyte layer provided between the anode and the separator, and an adhesion layer provided between the anode and the electrolyte layer, and wherein the anode includes an active material and a first polymer compound, the electrolyte layer includes an electrolytic solution and a second polymer compound, the adhesion layer includes a third polymer compound, the first polymer compound includes a polar group, the second polymer compound includes a polymer chain, and the third polymer compound includes a polar group and a polymer chain same as the polymer chain of the second polymer compound.

The term "polar group" refers to a group containing one or more of oxygen (O), nitrogen (N), and the like having high electronegativity.

The term "polymer chain" refers to a so-called skeleton (main chain) of a polymer compound. In the case where the polymer compound is a copolymer (in this case, since a plurality of polymerization components are included, a plurality of skeletons exist), the "polymer chain" refers to one or more skeletons of the polymerization components. However, in the case where respective contents (copolymerization amounts) of the respective polymerization components are different from each other, the "polymer chain" refers to one or more skeletons including a skeleton of a polymerization component having a relatively large copolymerization amount. In the case where the polymer compound is a mixture of two or more polymer compounds, the "polymer chain" refers to one or more skeletons of the polymer compounds. However, in the case where respective contents of the respective polymer compounds are different from each other, the "polymer chain" refers to one or more skeletons including a skeleton of a polymer compound having a relatively large content.

The term "the third polymer compound includes the same polymer chain as the polymer chain of the second polymer compound" refers to that the polymer chain of the second polymer compound has the same chemical structure as that of the polymer chain of the third polymer compound (the polymer chain of the second polymer compound is expressed by the same chemical formula as that of the polymer chain of the third polymer compound). It is to be noted that, the polar group of the first polymer compound and the polar group of the third polymer compound may be the same type, of different types.

According to the secondary battery of the embodiment of the present application, the adhesion layer is provided between the anode and the electrolyte layer, and the third polymer compound of the adhesion layer includes the polar group as the first polymer compound of the anode does, and includes the same polymer chain as the polymer chain of the second polymer compound of the electrolyte layer. Therefore, suppression of expansion and shrinkage of the active material and improvement of adhesibility of the anode with respect to the separator are allowed to be achieved at the same time. Further, the battery pack and the electric vehicle that use the secondary battery according to the embodiment of the present application, similar effects are obtainable.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
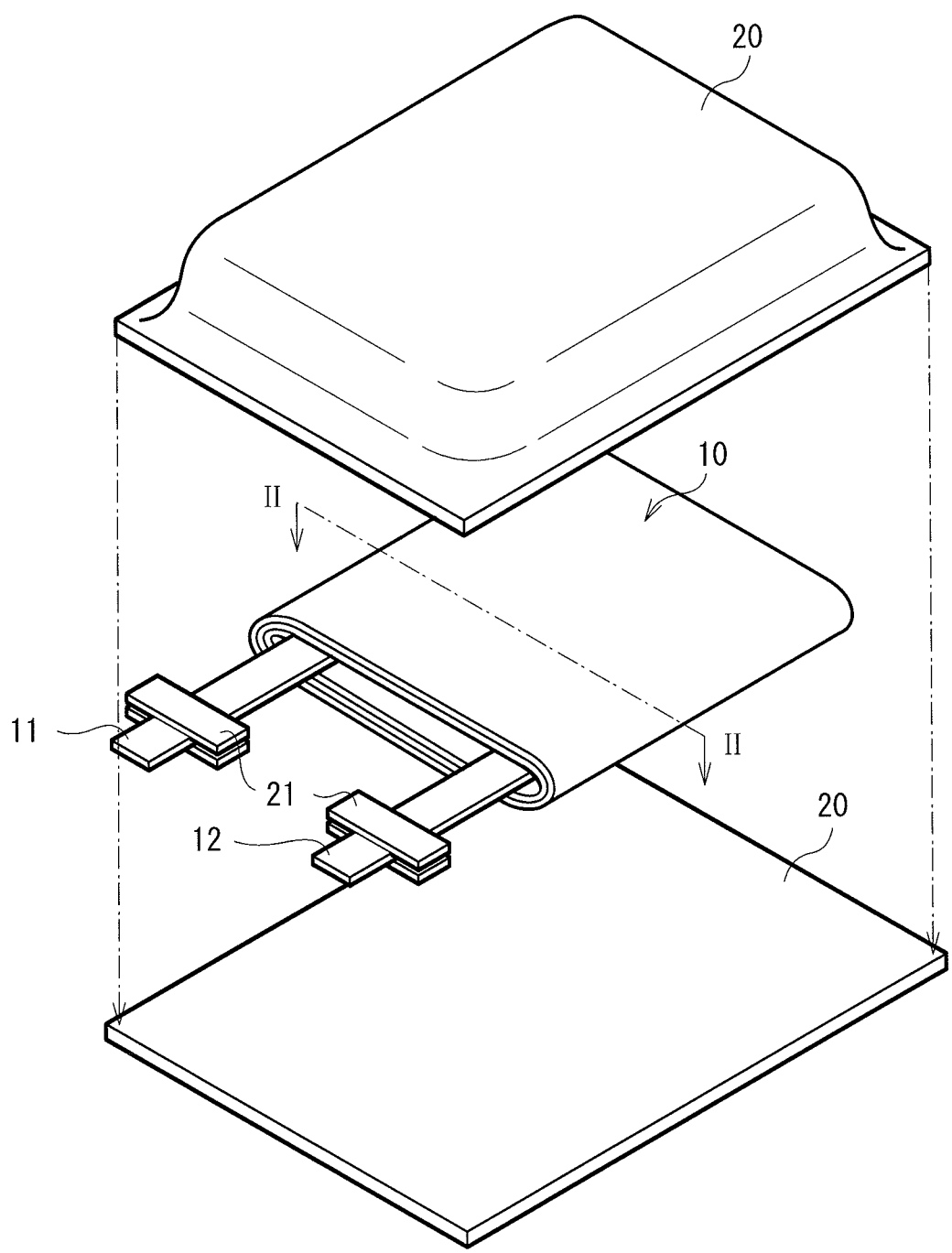
FIG. 1 is a perspective view illustrating a configuration of a secondary battery (laminated film type) according to an embodiment of the present application.
Figure 2:
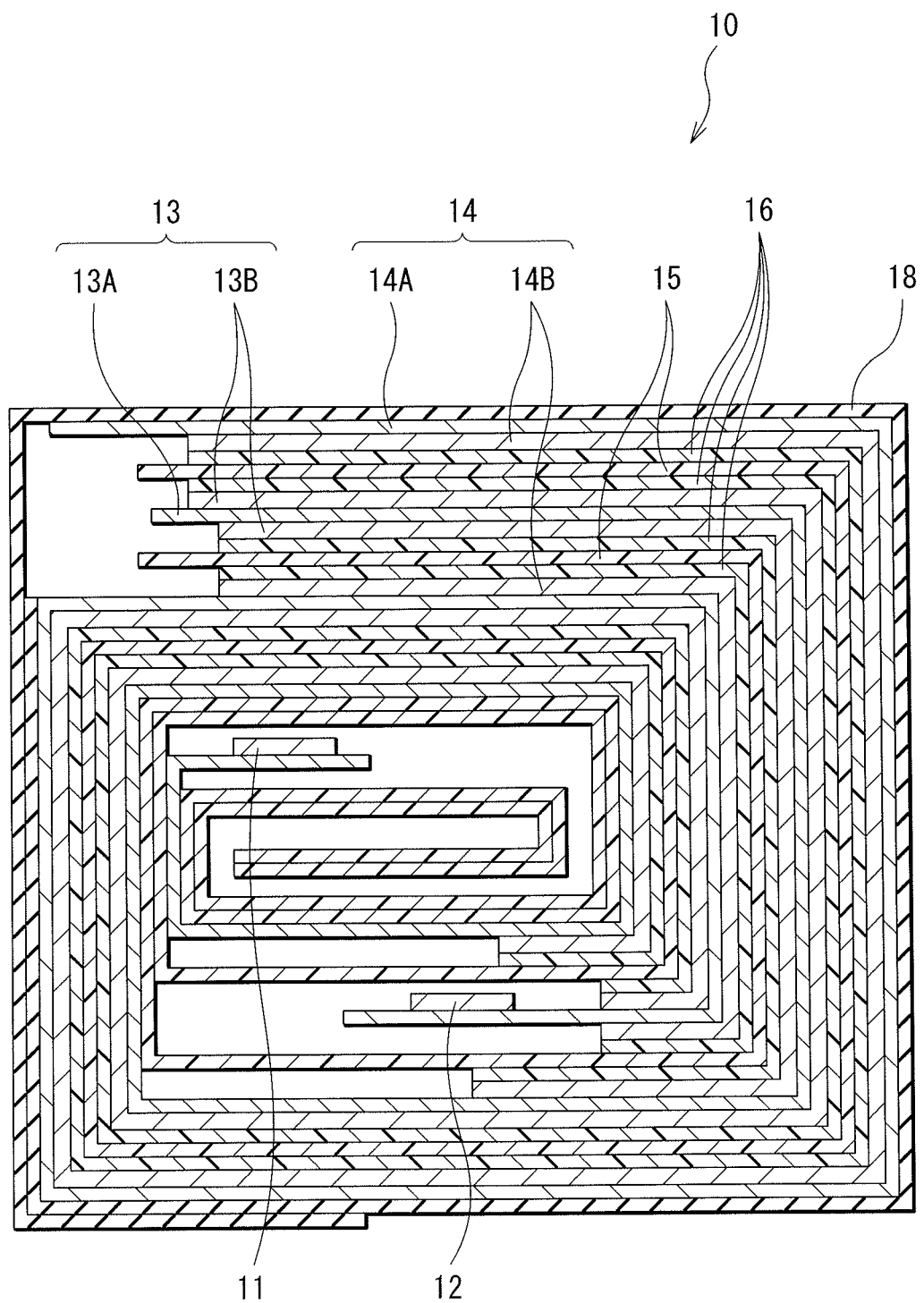
FIG. 2 is a cross-sectional view taken along a line II-II of a spirally wound electrode body illustrated in FIG. 1.
Figure 3:
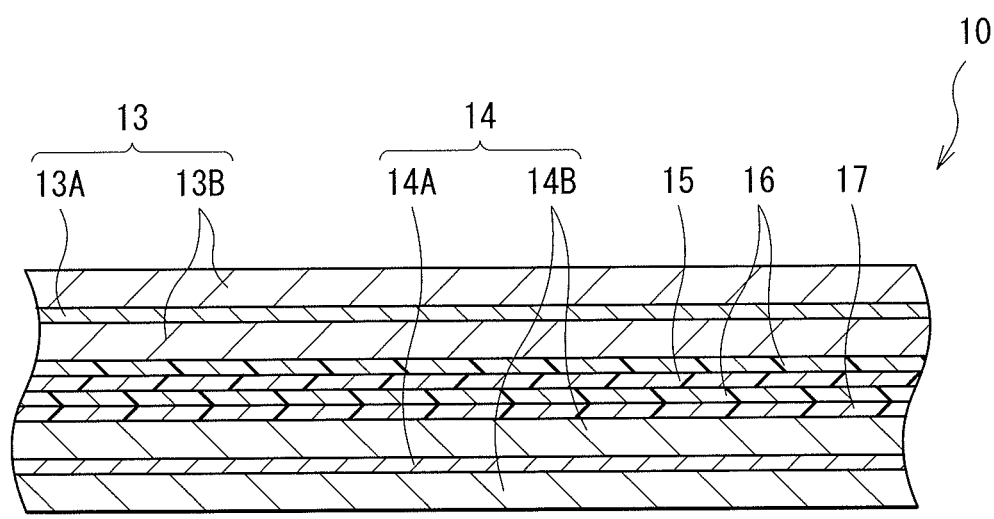
FIG. 3 is a cross-sectional view illustrating a detailed configuration of the spirally wound electrode body illustrated in FIG. 2.

An embodiment of the present application will be described below in detail with reference to the drawings. The description will be given in the following order.
1. Secondary Battery
2. Applications of Secondary Battery
 2-1. Battery Pack
 2-2. Electric Vehicle
 2-3. Electric Power Storage System
 2-4. Electric Power Tool
[1. Secondary Battery]
FIG. 1 illustrates a perspective configuration of a secondary battery according to an embodiment of the present application. FIG. 2 illustrates a cross-sectional configuration taken along a line II-II of a spirally wound electrode body 10 illustrated in FIG. 1. Further, FIG. 3 illustrates a detailed cross-sectional configuration of the spirally wound electrode body 10 illustrated in FIG. 2. It is to be noted that, in FIG. 1, as a matter of convenience, the spirally wound electrode body 10 is separated from an outer package member 20.

[Whole Configuration of Secondary Battery]
The secondary battery described here is a lithium ion secondary battery in which the capacity of an anode 14 is obtained by insertion and extraction of lithium (Li) as an electrode reactant.

The secondary battery may be, for example, a so-called laminated-film-type secondary battery. For example, the secondary battery may have the spirally wound electrode body 10 in the film-like outer package member 20. The spirally wound electrode body 10 is formed by laminating a cathode 13 and the anode 14 with a separator 15, an electrolyte layer 16, and an adhesion layer 17 in between, and subsequently spirally winding the resultant laminated body. A cathode lead 11 is attached to the cathode 13, and an anode lead 12 is attached to the anode 14. The outermost periphery of the spirally wound electrode body 10 is protected by a protective tape 18.

More specifically, the cathode 13 and the anode 14 are opposed to each other with the separator 15 in between. The electrolyte layer 16 is arranged between the cathode 13 and the separator 15, and is arranged between the anode 14 and the separator 15. The adhesion layer 17 is inserted between the anode 14 and the electrolyte layer 16. In association therewith, the electrolyte layer 16 is indirectly in contact with the anode 14 with the adhesion layer 17 in between. It is to be noted that illustration of the adhesion layer 17 is omitted in FIG. 2

The cathode lead 11 and the anode lead 12 may be, for example, led out from inside to outside of the outer package member 20 in the same direction. The cathode lead 11 may be made of, for example, a conductive material such as aluminum, and the anode lead 12 may be made of, for example, a conducive material such as copper, nickel, and stainless steel. These conductive materials may be in the shape of, for example, a thin plate or mesh.

The outer package member 20 may be a laminated film in which, for example, a fusion bonding layer, a metal layer, and a surface protective layer are laminated in this order. In the laminated film, for example, respective outer edges of the fusion bonding layers configured of two films are fusion-bonded so that the fusion bonding layers and the spirally wound electrode body 10 are opposed to each other. Alternatively, the two films may be attached to each other by an adhesive or the like. Examples of the fusion bonding layer may include a film made of polyethylene, polypropylene, or the like. Examples of the metal layer may include an aluminum foil. Examples of the surface protective layer may include a film made of nylon, polyethylene terephthalate, or the like.

In particular, the outer package member 20 may be preferably an aluminum laminated film in which a polyethylene film, an aluminum foil, and a nylon film are laminated in this order. However, the outer package member 20 may be made of a laminated film having other laminated structure, a polymer film such as polypropylene, or a metal film.

An adhesive film 21 to protect from outside air intrusion may be inserted between the outer package member 20 and the cathode lead 11 and between the outer package member 20 and the anode lead 12. The adhesive film 21 is made of a material having adhesibility with respect to the cathode lead 11 and the anode lead 12. Examples of the material having adhesibility may include a polyolefin resin such as polyethylene, polypropylene, modified polyethylene, and modified polypropylene.

[Cathode]

The cathode 13 has a cathode active material layer 13B on a single surface or both surfaces of a cathode current collector 13A. The cathode current collector 13A may be made of, for example, a conductive material such as aluminum, nickel, and stainless steel.

The cathode active material layer 13B contains, as cathode active materials, one or more of cathode materials capable of inserting and extracting lithium ions. The cathode active material layer 13B may further contain other materials such as a cathode binder and a cathode electric conductor as necessary.

The cathode material may be preferably a lithium-containing compound, since high energy density is thereby obtained. Examples of the lithium-containing compound may include a lithium-transition-metal composite oxide and a lithium-transition-metal-phosphate compound. The lithium-transition-metal composite oxide is an oxide containing Li and one or more transition metal elements as constituent elements. The lithium-transition-metal-phosphate compound is a phosphate compound containing Li and one or more transition metal elements as constituent elements. In particular, it is preferable that the transition metal element be one or more of Co, Ni, Mn, Fe, and the like, since a higher voltage is obtained thereby. The chemical formula thereof may be expressed by, for example, $Li_xM1O_2$ or $Li_yM2PO_4$. In the formulas, M1 and M2 represent one or more transition metal elements. Values of x and y vary according to the charge and discharge state, and are generally in the range of $0.05 \leq x \leq 1.1$ and $0.05 \leq y \leq 1.1$.

Examples of the lithium-transition-metal composite oxide may include $LiCoO_2$, $LiNiO_2$, and a lithium-nickel-based composite oxide represented by the following Formula (1). Examples of the lithium-transition-metal-phosphate compound may include $LiFePO_4$ and $LiFe_{1-u}Mn_uPO_4$ (u<1), since thereby, a high battery capacity is obtained and superior cycle characteristics and the like are obtained.

$$LiNi_{1-z}M_zO_2 \qquad (1)$$

In Formula (1), M is one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb. z satisfies $0.005 < z < 0.5$.

In addition thereto, the cathode material may be, for example, one or more of an oxide, a disulfide, a chalcogenide, an electrically-conductive polymer, and the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the electrically-conductive polymer may include sulfur, polyaniline, and polythiophene. However, the cathode material may be a material other than the foregoing materials.

Examples of the cathode binder may include one or more of synthetic rubbers, polymer materials, and the like. Examples of the synthetic rubber may include a styrene-butadiene-based rubber, a fluorine-based rubber, and ethylene propylene diene. Examples of the polymer material may include polyvinylidene fluoride and polyimide.

Examples of the cathode electric conductor may include one or more of carbon materials and the like. Examples of the carbon materials may include graphite, carbon black, acetylene black, and Ketjen black. The cathode electric conductor may be a metal material, an electrically-conductive polymer, or the like as long as the material has electric conductivity.

[Anode]

The anode 14 has an anode active material layer 14B on a single surface or both surfaces of an anode current collector 14A.

The anode current collector 14A may be made of, for example, an electrically-conductive material such as copper, nickel, and stainless steel. The surface of the anode current collector 14A may be preferably roughened. Thereby, due to a so-called anchor effect, adhesibility of the anode active material layer 14B with respect to the anode current collector 14A are improved. In this case, it is enough that the surface of the anode current collector 14A in a region opposed to the anode active material layer 14B is roughened at minimum. Examples of roughening methods may include a method of forming fine particles by utilizing electrolytic treatment. The electrolytic treatment is a method of providing concavity and convexity on the surface of the anode current collector 14A by forming fine particles on the surface of the anode current collector 14A with the use of an electrolytic method in an electrolytic bath. A copper foil fabricated by an electrolytic method is generally called "electrolytic copper foil."

The anode active material layer 14B contains an anode active material and an anode binder. The anode active material contains one or more of anode materials capable of inserting and extracting lithium ions. However, the anode active material layer 14B may also contain other materials such as an anode electric conductor as necessary. Details of the anode electric conductor are, for example, similar to those of the cathode electric conductor described above.

The chargeable capacity of the anode material may be preferably larger than the discharge capacity of the cathode 13 in order to prevent lithium metal from being unintentionally precipitated on the anode 14 in the middle of charge. That is, the electrochemical equivalent of the anode material capable of inserting and extracting lithium ions may be preferably larger than the electrochemical equivalent of the cathode 13.

The anode material may be, for example, a carbon material. In the carbon material, its crystal structure change at the time of insertion and extraction of lithium ions is extremely small. Therefore, the carbon material provides high energy density and the like. Further, the carbon material functions as an electric conductor as well. Examples of the carbon material may include graphitizable carbon, non-graphitizable carbon in which the spacing of (002) plane is equal to or greater than 0.37 nm, and graphite in which the spacing of (002) plane is equal to or smaller than 0.34 nm. More specifically, examples of the carbon material may include pyrolytic carbons, cokes, glassy carbon fiber, an organic polymer compound fired body, activated carbon, and carbon blacks. Examples of the cokes may include pitch coke, needle coke, and petroleum coke. The organic polymer compound fired body is obtained by firing (carbonizing) a polymer compound such as a phenol resin and a furan resin at appropriate temperature. In addition thereto, the carbon material may be low crystalline carbon or amorphous carbon heat-treated at temperature of about 1000 deg C. or less. It is to be noted that the shape of the carbon material may be any of a fibrous shape, a spherical shape, a granular shape, and a scale-like shape.

Further, the anode material may be, for example, a material (metal-based material) containing one or more of metal elements and metalloid elements as constituent elements, since higher energy density is thereby obtained. Such a metal-based material may be a simple substance, an alloy, or a compound, may be two or more thereof, or may be a material having one or more phases thereof in part or all thereof "Alloy" includes a material containing one or more metal elements and one or more metalloid elements, in addition to a material configured of two or more metal elements. Further, the "alloy" may contain a nonmetallic element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include one or more of metal elements and metalloid elements capable of forming an alloy with lithium ions. Specific examples thereof may include Mg, B, Al, Ga, In, Si, Ge, Sn, Pb, Bi, Cd, Ag, Zn, Hf, Zr, Y, Pd, and Pt. In particular, Si, Sn, or both are preferable. Si and Sn have a superior ability of inserting and extracting lithium ions and provide high energy density, and therefore, provide a high battery capacity.

A material (a high-capacity material) containing Si, Sn, or both as constituent elements may be a simple substance, an alloy, or a compound of Si or Sn, may be two or more thereof, or may be a material having one or more phases thereof in part or all thereof. However, the term "simple substance" merely refers to a general simple substance (a small amount of impurity may be therein contained), and does not necessarily refer to a purity 100% simple substance.

The alloys of Si may contain, for example, one or more of elements such as Sn, Ni, Cu, Fe, Co, Mn, Zn, In, Ag, Ti, Ge, Bi, Sb, and Cr as constituent elements other than Si. The compounds of Si may contain, for example, one or more of C, O, and the like as constituent elements other than Si. It is to be noted that, for example, the compounds of Si may contain one or more of the elements described for the alloys of Si as constituent elements other than Si.

Specific examples of the alloys of Si and the compounds of Si may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and $Li_xSiO_y$ ($0<x\leq4$, $0<y\leq4$). v in $SiO_v$ may be in the range of $0.2<v<1.4$.

The alloys of Sn may contain, for example, one or more of elements such as Si, Ni, Cu, Fe, Co, Mn, Zn, In, Ag, Ti, Ge, Bi, Sb, and Cr as constituent elements other than Sn. The compounds of Sn may contain, for example, one or more of elements such as C and O as constituent elements other than Sn. It is to be noted that the compounds of Sn may contain, for example, one or more of elements described for the alloys of Sn as constituent elements other than Sn. Specific examples of the alloys of Sn and the compounds of Sn may include $SnO_w$ ($0<w\leq2$), $SnSiO_3$, $LiSnO$, and $Mg_2Sn$.

In particular, as a material containing Sn as a constituent element, for example, a material containing a second constituent element and a third constituent element in addition to Sn as a first constituent element may be preferable. Examples of the second constituent element may include one or more of elements such as Co, Fe, Mg, Ti, V, Cr, Mn, Ni, Cu, Zn, Ga, Zr, Nb, Mo, Ag, In, Ce, Hf, Ta, W, Bi, and Si. Examples of the third constituent element may include one or more of B, C, Al, P, and the like. In the case where the second constituent element and the third constituent element are contained, high energy density and the like are obtained.

In particular, a material containing Sn, Co, and C as constituent elements (SnCoC-containing material) may be preferable. In the SnCoC-containing material, for example, the C content may be from 9.9 mass % to 29.7 mass % both inclusive, and the ratio of Sn and Co contents (Co/(Sn+Co)) may be from 20 mass % to 70 mass % both inclusive, since high energy density is obtained thereby.

It is preferable that the SnCoC-containing material have a phase containing Sn, Co, and C. Such a phase may be preferably low-crystalline or amorphous. The phase is a reaction phase capable of reacting with Li. Therefore, due to existence of the reaction phase, superior characteristics are obtained. The half bandwidth of the diffraction peak obtained by X-ray diffraction of the phase may be preferably equal to or greater than 1 deg based on diffraction angle of 2θ in the case where CuKα ray is used as a specific X ray, and the insertion rate is 1 deg/min. Thereby, lithium ions are more smoothly inserted and extracted, and reactivity with the electrolytic solution is decreased. It is to be noted that, in some cases, the SnCoC-containing material includes a phase containing a simple substance or part of the respective constituent elements in addition to the low-crystalline phase or the amorphous phase.

Whether or not the diffraction peak obtained by the X-ray diffraction corresponds to the reaction phase capable of reacting with Li is allowed to be easily determined by comparison between X-ray diffraction charts before and after electrochemical reaction with Li. For example, if the position of the diffraction peak after electrochemical reaction with Li is changed from the position of the diffraction peak before the electrochemical reaction with Li, the obtained diffraction peak corresponds to the reaction phase capable of reacting with Li. In this case, for example, the diffraction peak of the low crystalline reaction phase or the amorphous reaction phase is seen in the range of 2θ=from 20 deg to 50 deg both inclusive. Such a reaction phase may have, for example, the foregoing respective constituent elements, and the low crystalline or amorphous structure thereof possibly results from existence of C mainly.

In the SnCoC-containing material, part or all of C as a constituent element may be preferably bonded to a metal element or a metalloid element as other constituent element, since cohesion or crystallization of Sn and/or the like is suppressed thereby. The bonding state of elements is allowed to be checked with the use of, for example, X-ray photoelectron spectroscopy (XPS). In a commercially available device, for example, as a soft X ray, Al—Kα ray, Mg—Kα ray, or the like may be used. In the case where part or all of C are bonded to a metal element, a metalloid element, or the like, the peak of a synthetic wave of 1s orbit of C(C1s) is shown in a region lower than 284.5 eV. It is to be noted that in the device, energy calibration is made so that the peak of 4f orbit of Au atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis may be made by using commercially available software to isolate both peaks from each other. In the waveform analysis, the position of the main peak existing on the lowest bound energy side is the energy standard (284.8 eV).

It is to be noted that the SnCoC-containing material is not limited to the material configured of only Sn, Co, and C (SnCoC) as constituent elements. The SnCoC-containing material may further contain, for example, one or more of Si, Fe, Ni, Cr, In, Nb, Ge, Ti, Mo, Al, P, Ga, Bi, and the like as constituent elements in addition to Sn, Co, and C.

In addition to the SnCoC-containing material, a material containing Sn, Co, Fe, and C as constituent elements (SnCoFeC-containing material) may be also preferable. The composition of the SnCoFeC-containing material may be arbitrarily set. For example, the composition in which the Fe content may be set small is as follows. That is, the C content may be from 9.9 mass % to 29.7 mass % both inclusive, the Fe content may be from 0.3 mass % to 5.9 mass % both inclusive, and the ratio of contents of Sn and Co (Co/(Sn+Co)) may be from 30 mass % to 70 mass % both inclusive.

Further, the composition in which the Fe content is set large is as follows. That is, the C content may be from 11.9 mass % to 29.7 mass % both inclusive, the ratio of contents of Sn, Co, and Fe((Co+Fe)/(Sn+Co+Fe)) may be from 26.4 mass % to 48.5 mass % both inclusive, and the ratio of contents of Co and Fe (Co/(Co+Fe)) may be from 9.9 mass % to 79.5 mass % both inclusive. In such a composition range, high energy density is obtained. The physical properties (such as half bandwidth) of the SnCoFeC-containing material are similar to those of the foregoing SnCoC-containing material.

In addition thereto, the anode material may be, for example, one or more of a metal oxide, a polymer compound, and the like. Examples of the metal oxide may include iron oxide, ruthenium oxide, and molybdenum oxide. Examples of the polymer compound may include polyacetylene, polyaniline, and polypyrrole. However, the anode material may be a material other than the foregoing materials.

The anode binder contains a polymer compound for binding (binding-use polymer compound) as a first polymer compound. The binding-use polymer compound contains one or more polar groups. As described above, the "one or more polar groups" are groups each containing one or more of oxygen (O), nitrogen (N), and the like having high electronegativity as constituent elements. Specific examples of the polar groups may include one or more of a carboxyl group (—COOH), a hydroxyl group (—OH), an amino group (—NH$_2$), a nitro group (—NO$_2$), a cyano group (—CN), a carbonyl group (—C(=O)—), and the like.

The reason why the binding-use polymer compound contains one or more polar groups is that, in general, since interaction such as hydrogen bonding and electrostatic bonding is generated between one polymer chain including a polar group and another polar chain adjacent to the foregoing one polymer chain through the polar group, strength of the anode 14 is improved. It is to be noted that the foregoing interaction is generated not only between one polymer chain and another polymer chain, but also between one polymer chain and any of a current collector, an active material, a conductive auxiliary agent, and the like. Thereby, even in the case of being influenced by stress (such as internal stress resulting from expansion and shrinkage of an anode active material) generated at the time of charge and discharge, the anode active material layer 14B is less likely to be peeled off from the anode current collector 14A, and the anode active material layer 14B is less likely to be broken.

Types of the binding-use polymer compound are not particularly limited, as long as the binding-use polymer compound is one or more of polymer materials including a polar group. In particular, the polymer material including a polar group may be preferably engineering plastic having superior physical characteristics such as tensile strength and flexural modulus. One reason for this is that, in this case, mechanical strength of the binding-use polymer compound is secured, and therefore, influence of expansion and shrinkage of the anode active material is suppressed at the time of charge and discharge. Specific examples of the polymer material including the polar group may include one or more of polyimide, polyamide (including aramid), polyamideimide, polyacrylic acid, carboxymethylcellulose, and the like. It is to be noted that specific examples of the polymer material including a polar group may include a material other than carboxymethylcellulose as long as the material is a soluble cellulose derivative.

The anode active material layer 14B may be formed by, for example, a coating method, a firing method (sintering method), or a combination of two or more of these methods.

In the coating method, after a solution in which a mixture of a particulate (powder) anode active material, an anode binder and/or the like is mainly dispersed in an organic solvent or the like is prepared, the anode current collector 14A is coated with the solution, and the resultant is dried. The firing method may be, for example, a method in which after the anode current collector 14A is coated with a solution with the use of a coating method, heat treatment is performed on the resultant coating film at temperature higher than the melting point of the anode binder and/or the like. Examples of the firing method may include an atmosphere firing method, a reactive firing method, and a hot press firing method.

In the secondary battery, as described above, in order to prevent lithium metal from being unintentionally precipitated on the anode 14 in the middle of charge, the electrochemical equivalent of the anode material capable of inserting and extracting lithium ions is larger than the electrochemical equivalent of the cathode 13. Further, in the case where the open circuit voltage (that is, a battery voltage) at the time of completely-charged state is equal to or greater than 4.25 V, the extraction amount of lithium ions per unit mass is larger than that in the case where the open circuit voltage is 4.2 V even if the same cathode active material is used. Therefore, amounts of the cathode active material and the anode active material are adjusted accordingly. Thereby, high energy density is obtainable.

[Separator]

The separator 15 separates the cathode 13 from the anode 14, and passes lithium ions while preventing current short circuit resulting from contact of both electrodes. The separator 15 may be, for example, a porous film made of a synthetic resin, ceramics, or the like. The separator 15 may be a laminated film in which two or more types of porous films are laminated. Examples of the synthetic resin may include polytetrafluoroethylene, polypropylene, and polyethylene.

[Electrolyte Layer]

The electrolyte layer 16 contains an electrolytic solution and a polymer compound for the electrolyte (electrolyte-use polymer compound) as a second polymer compound. That is, the electrolyte layer 16 is a gel electrolyte in which the electrolytic solution is held by the electrolyte-use polymer compound. One reason for this is that, in this case, high ion conductivity (for example, 1 mS/cm or more at room temperature) is obtained and liquid leakage of the electrolytic solution is prevented. However, the electrolyte layer 16 may contain other material such as an additive as necessary.

Types of the electrolyte-use polymer compound are not particularly limited, as long as the compound is one or more polymer materials that have ion conductivity in a range of temperature at which the secondary battery is used, and have characteristics capable of keeping the electrolytic solution in a state of a solid. As described later, since the adhesion layer 17 is inserted between the anode 14 and the electrolyte layer 16, adhesibility of the anode 14 with respect to the electrolyte layer 16 is secured by the adhesion layer 17. The term "characteristics capable of keeping the electrolytic solution in a state of a solid" refers to, for example, a case that a polymer material has characteristics capable of forming gel with a solvent in an electrolytic solution.

It is to be noted that types of the electrolyte-use polymer compound may be arbitrarily selected according to various performances and the like needed for the electrolyte layer 16. In this example, the electrolyte-use polymer compound may contain, for example, a halogenated alkylene group or the like as a polymer chain, and more specifically, may contain a difluoro ethylene group ($—CH_2—CF_2—$) or the like.

The "polymer chain" refers to, as described above, a so-called skeleton (main chain) of a polymer compound. In the case where the polymer compound is a copolymer (in this case, since a plurality of polymerization components are included, a plurality of skeletons exist), the "polymer chain" refers to one or more skeletons of the polymerization components. However, in the case where respective contents (copolymerization amounts) of the respective polymerization components are different from each other, the "polymer chain" refers to one or more skeletons including a skeleton of a polymerization component having a relatively large copolymerization amount (such as the maximum content). In the case where the polymer compound is a mixture of two or more polymer compounds, the "polymer chain" refers to one or more skeletons of the polymer compounds. However, in the case where respective contents of the respective polymer compounds are different from each other, the "polymer chain" refers to one or more skeletons including a skeleton of a polymer compound having a relatively large content (such as the maximum content).

Specific examples of the electrolyte-use polymer compound may include polyvinylidene fluoride. A copolymer having vinylidene fluoride as a monomer unit or the like may be used. Examples of the copolymer may include a copolymer having vinylidene fluoride and hexafluoropropylene as monomer units. Conditions such as the introduction amount (copolymerization amount) of the hexafluoropropylene may be arbitrarily set.

In the case where the electrolyte-use polymer compound is the foregoing copolymer, the polymer chain may be a skeleton of a copolymerization section of vinylidene fluoride or a skeleton of a copolymerization section of hexafluoropropylene. However, in the case where a copolymerization amount of vinylidene fluoride is larger than a copolymerization amount of hexafluoropropylene, the polymer chain may be preferably a skeleton of a polymerization section of vinylidene fluoride. In contrast, in the case where the copolymerization amount of hexafluoropropylene is larger than the copolymerization amount of vinylidene fluoride, the polymer chain may be preferably a skeleton of a polymerization section of hexafluoropropylene. It is to be noted that, in either case, the polymer chain may be both the skeleton of the polymerization section of vinylidene fluoride and the skeleton of the polymerization section of hexafluoropropylene.

The electrolytic solution contains a solvent and an electrolyte salt, and may contain other material such as an additive as necessary.

The solvent contains one or more of nonaqueous solvents such as an organic solvent. Examples of the nonaqueous solvents may include a cyclic ester carbonate, a chain ester carbonate, lactone, a chain carboxylic ester, and nitrile, since thereby, a superior battery capacity, superior cycle characteristics, superior conservation characteristics, and the like are obtained. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methylpropyl carbonate. Examples of the lactone may include γ-butyrolactone and γ-valerolactone. Examples of the carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

In addition thereto, examples of the nonaqueous solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. Thereby, a similar advantage is obtained.

In particular, one or more of ethylene carbonate, propylene carbonate, dimethyl carbonate, diethyl carbonate, and ethyl methyl carbonate may be preferable, since thereby, a superior battery capacity, superior cycle characteristics, superior conservation characteristics, and the like are obtained. In this case, a combination of a high viscosity (high dielectric constant) solvent (for example, specific dielectric constant $\varepsilon \geq 30$) such as ethylene carbonate and propylene carbonate and a low viscosity solvent (for example, viscosity<1 mPa·s) such as dimethyl carbonate, ethylmethyl carbonate, and diethyl carbonate may be more preferable. One reason for this is that the dissociation property of the electrolyte salt and ion mobility are improved.

In particular, the solvent may preferably contain one or more of unsaturated cyclic ester carbonates. One reason for this is that a stable protective film is formed mainly on the surface of the anode 14 at the time of charge and discharge, and therefore, a decomposition reaction of the electrolytic solution is suppressed. The unsaturated cyclic ester carbonate is a cyclic ester carbonate having one or more unsaturated carbon bonds (carbon-carbon double bonds). Examples thereof may include vinylene carbonate, vinylethylene carbonate, and methyleneethylene carbonate. The content of the unsaturated cyclic ester carbonate in the solvent is not particularly limited, and may be, for example, from 0.01 wt % to 10 wt % both inclusive.

Further, the solvent may preferably contain one or more of halogenated ester carbonates. One reason for this is that a stable protective film is formed mainly on the surface of the anode 22 at the time of charge and discharge, and therefore, a decomposition reaction of the electrolytic solution is suppressed. The halogenated ester carbonate is a cyclic ester carbonate having one or more halogens as constituent elements or a chain ester carbonate having one or more halogens as constituent elements. Examples of a cyclic halogenated ester carbonate may include 4-fluoro-1,3-dioxolane-2-one and 4,5-difluoro-1,3-dioxolane-2-one. Examples of a chain halogenated ester carbonate may include fluoromethyl methyl carbonate, bis(fluoromethyl) carbonate, and difluoromethyl methyl carbonate. Although the content of the halogenated ester carbonate in the solvent is not particularly limited, the content thereof may be, for example, from 0.01 wt % to 50 wt % both inclusive.

Further, the solvent may preferably contain one or more sultones (cyclic sulfonic ester), since the chemical stability of the electrolytic solution is more improved thereby. Examples of sultone may include propane sultone and propene sultone. Although the sultone content in the solvent is not particularly limited, for example, the sultone content may be from 0.5 wt % to 5 wt % both inclusive.

Further, the solvent may preferably contain one or more acid anhydrides since the chemical stability of the electrolytic solution is thereby further improved. Examples of the acid anhydrides may include a carboxylic anhydride, a disulfonic anhydride, and a carboxylic acid sulfonic acid anhydride. Examples of the carboxylic anhydride may include a succinic anhydride, a glutaric anhydride, and a maleic anhydride. Examples of the disulfonic anhydride may include an ethane disulfonic anhydride and a propane disulfonic anhydride. Examples of the carboxylic acid sulfonic acid anhydride may include a sulfobenzoic anhydride, a sulfopropionic anhydride, and a sulfobutyric anhydride. Although the content of the acid anhydride in the solvent is not particularly limited, for example, the content thereof may be from 0.5 wt % to 5 wt % both inclusive.

The electrolyte salt may contain, for example, one or more of lithium salts. However, the electrolyte salt may contain, for example, a salt other than the lithium salt (such as a light metal salt other than the lithium salt) as necessary.

Examples of the lithium salts may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Thereby, a superior battery capacity, superior cycle characteristics, superior conservation characteristics, and the like are obtained.

In particular, one or more of $LiPF_6$, $LiBF_4$, $LiClO_4$, and $LiAsF_6$ may be preferable, and $LiPF_6$ may be more preferable, since the internal resistance is thereby lowered, and therefore, a higher effect is obtained.

The content of the electrolyte salt may be preferably from 0.3 mol/kg to 3.0 mol/kg both inclusive with respect to the solvent, since high ion conductivity is obtained thereby.

[Adhesion Layer]

The adhesion layer 17 is interposed between the anode 14 and the electrolyte layer 16, and thereby, makes the anode 14 be in contact with the electrolyte layer 16.

The adhesion layer 17 contains a polymer compound for adhesion (adhesion-use polymer compound) as a third polymer compound. The adhesion-use polymer compound includes a polar group and the same polymer chain as the polymer chain of the electrolyte-use polymer compound described above.

The term "polymer chain" and the term "polar group" refer to definitions similar to those described for the binding-use polymer compound and the electrolyte-use polymer compound. The term "the adhesion-use polymer compound includes the same polymer chain as the polymer chain of the electrolyte-use polymer compound" refers to, as described above, that the polymer chain of the electrolyte-use polymer compound has the same chemical structure as that of the polymer chain of the adhesion-use polymer compound (the polymer chain of the electrolyte-use polymer compound is expressed by the same chemical formula as that of the polymer chain of the adhesion-use polymer compound). However, the polar group of the electrolyte-use polymer compound and the polar group of the adhesion-use polymer compound may be the same type, of different types.

The adhesion-use polymer compound contains the same polymer chain as the polymer chain of the electrolyte-use polymer compound. One reason for this is that, in this case, as described above, due to interaction between the polymer chain of the adhesion-use polymer compound and the polymer chain of the electrolyte-use polymer compound, the adhesion layer 17 is rigidly in contact with the electrolyte layer 16. More specifically, in general, in the case where a polymer material is swollen with respect to a solvent, the same types of polymer chains are easily compatible, and the polymer chain as a repetition unit occupy major part in the structure of the polymer material. Therefore, there is a tendency that, polymer materials including the same types of polymer chains are mechanically bonded and bound due to three-dimensional entanglement of the polymer chains associated with compatibility. Further, swelling of the polymer chains with respect to the solvent and entanglement of the polymer chains adjacent to each other easily occur by heating. Thereby, in the case where the adhesion-use polymer compound contains the same type of polymer chain as the polymer chain of the electrolyte-use polymer compound, when the adhesion-use polymer compound is heated, partial swelling occurs temporarily with respect to the solvent of the electrolytic solution. In this case, three-dimensional entanglement of the polymer chains is formed between the adhesion-use polymer compound and the electrolyte-use polymer compound, and such entanglement is retained even after cooling down to ambient temperature, and therefore, strong adhesibility is created. It is to be noted that the term "when the adhesion-use polymer compound is heated" may refer to, for example, a case that a precursor solution used for forming the electrolyte layer 16 is dried and a case that the cathode active material layer 13B and the anode active material layer 14B are thermally molded. Therefore, adhesibility of the adhesion layer 17 with respect to the electrolyte layer 16 is secured, and therefore, even in the case of being influenced by stress (such as internal stress resulting from expansion and shrinkage of the anode active material) generated at the time of charge and discharge, the adhesion layer 17 is less likely to be peeled off from the electrolyte layer 16.

Further, the adhesion-use polymer compound contains the polar group. The first reason for this is that, in this case, as described above, since strong adhesibility is created due to interaction between the polar group of the adhesion-use polymer compound and the polar group of the binding-use polymer compound, the adhesion layer 17 is rigidly in contact with the anode 14. The second reason for this is that, in this case, since the polar group is included, swelling characteristics with respect to the electrolytic solution is suppressed in a range at which the secondary battery is used, adhesibility of the adhesion layer 17 with respect to the anode 14 is retained even in the case of being impregnated with the electrolytic solution. Thereby, adhesibility of the adhesion layer 17 with respect to the anode 14 is secured. Therefore, even in the case of being influenced by stress generated at the time of charge and discharge, the adhesion layer 17 is less likely to be peeled off from the anode 14.

Types of the adhesion-use polymer compounds are not particularly limited, as long as the compounds are one or more of polymer materials including the foregoing polymer chain and the foregoing polar group. Specific examples of the adhesion-use polymer compounds may include a copolymer of maleate such as monomethyl maleate and vinylidene fluoride. Alternatively, examples of the adhesion-use polymer compounds may include a mixture of polyacrylic acid and the like and polyvinylidene fluoride. As described above, the adhesion-use polymer compound may be a copolymer, a mixture of two or more different types of homopolymers, or a mixture of a copolymer and a homopolymer.

In the case where the adhesion-use polymer compound is the foregoing copolymer, the polymer chain may be a skeleton of a copolymerization section of vinylidene fluoride or a skeleton of a copolymerization section of maleate. However, in the case where a copolymerization amount of vinylidene fluoride is larger than a copolymerization amount of maleate, the polymer chain may be preferably a skeleton of a polymerization section of vinylidene fluoride. In contrast, in the case where the copolymerization amount of maleate is larger than the copolymerization amount of vinylidene fluoride, the polymer chain may be preferably a skeleton of a polymerization section of maleate. It is to be noted that, in either case, the polymer chain may be both the copolymerization section of vinylidene fluoride and the copolymerization section of maleate.

Further, in the case where the adhesion-use polymer compound is the foregoing mixture, the polymer chain may be a skeleton of polyvinylidene fluoride or a skeleton of polyacrylic acid. However, in the case where the content of polyvinylidene fluoride is larger than the content of polyacrylic acid, the polymer chain may be preferably a skeleton of polyvinylidene fluoride. In contrast, in the case where the content of polyacrylic acid is larger than the content of polyvinylidene fluoride, the polymer chain may be preferably a skeleton of polyacrylic acid. It is to be noted that, in either case, the polymer chain may be both the skeleton of vinylidene fluoride and the skeleton of polyacrylic acid.

[Operation of Secondary Battery]

In the secondary battery, for example, at the time of charge, lithium ions extracted from the cathode 13 are inserted in the anode 14 through the electrolytic solution. Further, at the time of discharge, lithium ions extracted from the anode 14 are inserted in the cathode 13 through the electrolytic solution.

[Method of Manufacturing Secondary Battery]

The secondary battery may be manufactured, for example, by any of the following procedures.

In the first procedure, first, the cathode 13 is fabricated. In this case, a cathode active material is mixed with a cathode binder, a cathode electric conductor, and/or the like as necessary to prepare a cathode mixture. Subsequently, the cathode mixture is dispersed in an organic solvent or the like to obtain paste cathode mixture slurry. Subsequently, both surfaces of the cathode current collector 13A are coated with the cathode mixture slurry, which is dried to form the cathode active material layer 13B. Subsequently, the cathode active material layer 13B is compression-molded with the use of a roll pressing machine and/or the like while heating the cathode active material layer 13B as necessary. In this case, compression-molding may be repeated several times.

Further, the anode 14 is fabricated by a procedure similar to that of the cathode 13 described above. In this case, an anode active material and an anode binder (binding-use polymer compound) are mixed with an anode electric conductor and/or the like as necessary to prepare an anode mixture, which is subsequently dispersed in an organic solvent or the like to form paste anode mixture slurry. Subsequently, both surfaces of the anode current collector 14A are coated with the anode mixture slurry, which is dried to form the anode active material layer 14B. Thereafter, the anode active material layer 14B is compression-molded as necessary.

Subsequently, the adhesion layer 17 is formed on the anode 14. In this case, a adhesion-use polymer compound is dispersed in an organic solvent or the like to obtain a process solution. Thereafter, the surface of the anode active material layer 14B is coated with the process solution, and the resultant is dried.

Subsequently, a precursor solution containing an electrolytic solution in which an electrolyte salt is dispersed in a solvent, a electrolyte-use polymer compound, and a solvent such as an organic solvent is prepared. Thereafter, the cathode 13 and the adhesion layer 17 are coated with the precursor solution to form the gel electrolyte layer 16.

Subsequently, the cathode lead 11 is attached to the cathode current collector 13A with the use of a welding method and/or the like, and the anode lead 12 is attached to the anode current collector 14A with the use of a welding method and/or the like. Subsequently, the cathode 13 and the anode 14 are layered with the separator 15 in between and are spirally wound, and thereby, the spirally wound electrode body 10 is fabricated. Thereafter, the protective tape 18 is adhered to the outermost periphery thereof. Subsequently, after the spirally wound electrode body 10 is sandwiched between two pieces of film-like outer package members 20, the outer edges of the outer package members 20 are bonded with the use of a thermal fusion bonding method and/or the like. Thereby, the spirally wound electrode body 10 is enclosed into the outer package members 20. In this case, the adhesive films 21 are inserted between the cathode lead 11 and the outer package member 20 and between the anode lead 12 and the outer package member 20.

In the second procedure, the cathode 13, the anode 14, and the adhesion layer 17 are formed in a procedure similar to the first procedure. Thereafter, the cathode lead 11 is attached to the cathode 13, and the anode lead 12 is attached to the anode 14. Subsequently, the cathode 13 and the anode 14 are layered with the separator 15 in between and are spirally wound to fabricate a spirally wound body as a precursor of the spirally wound electrode body 10. Thereafter, the protective tape 18 is adhered to the outermost periphery thereof. Subsequently, after the spirally wound body is sandwiched between two pieces of the film-like outer package members 20, the outermost peripheries except for one side are bonded with the use of a thermal fusion bonding method and/or the like to obtain a pouched state, and the spirally wound body is contained in the pouch-like outer package member 20. Subsequently, a composition for the electrolyte containing an electrolytic solution, a monomer as a raw material for the electrolyte-use polymer compound, a polymerization initiator, and other materials such as a polymerization inhibitor as necessary is prepared. Subsequently, the composition for the electrolyte is injected into the pouch-like outer package member 20. Thereafter, the outer package member 20 is hermetically sealed with the use of a thermal fusion bonding method and/or the like. Subsequently, the monomer is thermally polymerized, and thereby, a electrolyte-use polymer compound is formed. Accordingly, the gel electrolyte layer 16 is formed.

In the third procedure, the spirally wound body is fabricated and contained in the pouch-like outer package member 20 in a manner similar to that of the foregoing second procedure, except that the separator 15 with both surfaces coated with a polymer compound is used. Examples of the polymer compound with which the separator 15 is coated may include a polymer (a homopolymer, a copolymer, or a multicomponent copolymer) containing vinylidene fluoride as a component. Specific examples thereof may include polyvinylidene fluoride, a binary copolymer containing vinylidene fluoride and hexafluoro propylene as components, a ternary copolymer containing vinylidene fluoride, hexafluoro propylene, and chlorotrifluoroethylene as components. It is to be noted that, in addition to the polymer containing vinylidene fluoride as a component, other one or more polymer compounds may be used. Subsequently, an electrolytic solution is prepared and injected into the outer package member 20. Thereafter, the opening of the outer package member 20 is hermetically sealed with the use of a thermal fusion bonding method and/or the like. Subsequently, the resultant is heated while a weight is applied to the outer package member 20, and the separator 15 is adhered to the cathode 13 and the anode 14 with the polymer compound in between. Thereby, the polymer compound is impregnated with the electrolytic solution, and accordingly, the polymer compound is gelated to form the electrolyte layer 16.

In the third procedure, swollenness of the secondary battery is suppressed more than in the first procedure. Further, in the third procedure, the monomer as a raw material of the polymer compound, the solvent, and the like are less likely to be left in the electrolyte layer 16 compared to in the second procedure. Therefore, the formation step of the polymer compound is favorably controlled. Therefore, the cathode 13, the anode 14, and the separator 15 sufficiently adhere to the electrolyte layer 16.

[Function and Effect of Secondary Battery]

According to the secondary battery, the adhesion layer 17 is inserted between the anode 14 and the electrolyte layer 16. The adhesion-use polymer compound of the adhesion layer 17 includes the polar group as the binding-use polymer compound of the anode 14 does, and includes the same polymer chain as the polymer chain of the electrolyte-use polymer compound of the electrolyte layer 16. In this case, as described above, with the use of engineering plastic or the like having superior mechanical strength as the binding-use polymer compound, influence of expansion and shrinkage of the anode active material is suppressed at the time of charge and discharge. Further, adhesibility of the adhesion layer 17 with respect to the anode 14 is improved due to interaction between polar groups, and adhesibility of the adhesion layer 17 with respect to the electrolyte layer 16 is improved due to interaction between polymer chains. Therefore, the anode 14 is rigidly in contact with the electrolyte layer 16 with the adhesion layer 17 in between. Accordingly, suppression of expansion and shrinkage of the anode active material and improvement of adhesibility of the anode 14 with respect to the separator 15 are allowed to be achieved at the same time.

In particular, in the case where the anode 14 contains a high-capacity material as an anode active material, the anode active material is easily expanded and shrunk significantly at the time of charge and discharge. Therefore, while adhesibility of the anode 14 with respect to the separator 15 is improved, expansion and shrinkage of the anode active material are allowed to be effectively suppressed.

[2. Applications of Secondary Battery]

Next, a description will be given of application examples of the foregoing secondary battery.

Applications of the secondary battery are not particularly limited as long as the secondary battery is applied to a machine, a device, an instrument, an apparatus, a system (collective entity of a plurality of devices and the like), or the like that is allowed to use the secondary battery as a driving electric power source, an electric power storage source for electric power storage, or the like. It is to be noted that the secondary battery used as an electric power source may be a main electric power source (electric power source used preferentially), or may be an auxiliary electric power source (electric power source used instead of a main electric power source or used being switched from the main electric power source). In the case where the secondary battery is used as an auxiliary electric power source, the main electric power source type is not limited to the secondary battery.

Examples of applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a personal digital assistant. Further examples thereof may include a mobile lifestyle electric appliance such as an electric shaver; a memory device such as a backup electric power source and a memory card; an electric power tool such as an electric drill and an electric saw; a battery pack used for a notebook personal computer or the like as an attachable and detachable electric power source; a medical electronic apparatus such as a pacemaker and a hearing aid; an electric vehicle such as an electric automobile (including a hybrid automobile); and an electric power storage system such as a home battery system for storing electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, or the like. One reason for this is that, in these applications, since superior battery characteristics are demanded, performance is effectively improved with the use of the secondary battery according to the embodiment of the present application. It is to be noted that the battery pack is an electric power source using a secondary battery, and is a so-called assembled battery or the like. The electric vehicle is a vehicle that works (runs) with the use of a secondary battery as a driving electric power source. As described above, the electric vehicle may be an automobile (such as a hybrid automobile) including a drive source other than a secondary battery. The electric power storage system is a system using a secondary battery as an electric power storage source. For example, in a home electric power storage system, electric power is stored in the secondary battery as an electric power storage source, and the electric power is consumed as necessary. Thereby, home electric products and the like become usable. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

A description will be specifically given of some application examples of the secondary battery. The configurations of the respective application examples explained below are merely examples, and may be changed as appropriate.

[2-1. Battery Pack]

Figure 4:
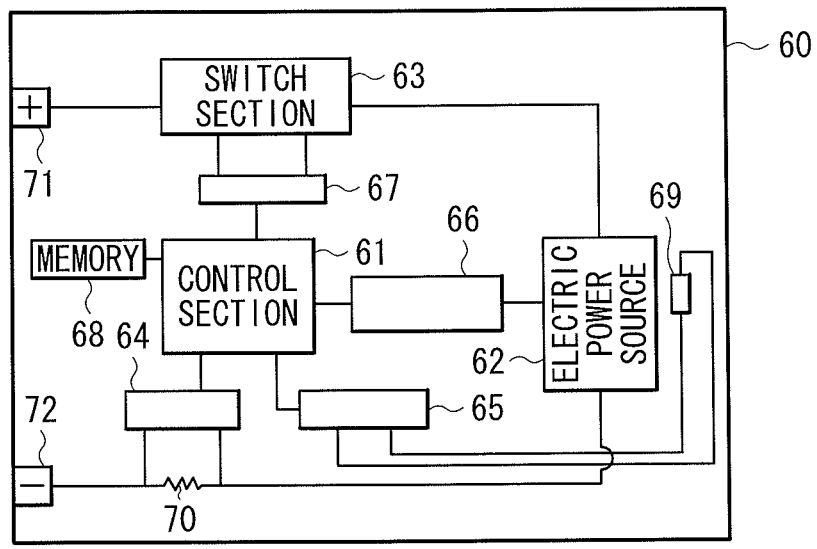
FIG. 4 is a block diagram illustrating a configuration of an application example (battery pack) of the secondary battery.

FIG. 4 illustrates a block configuration of a battery pack. For example, the battery pack may include a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60 made of a plastic material and/or the like.

The control section 61 controls operation of the whole battery pack (including a used state of the electric power source 62), and may include, for example, a central processing unit (CPU) and/or the like. The electric power source 62 includes one or more secondary batteries (not illustrated). The electric power source 62 may be, for example, an assembled battery including two or more secondary batteries. Connection type of these secondary batteries may be a series-connected type, may be a parallel-connected type, or a mixed type thereof. As an example, the electric power source 62 may include six secondary batteries connected in a manner of dual-parallel and three-series.

The switch section 63 switches the used state of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection device 69, and outputs the measurement result to the control section 61. The temperature measurement result may be used for, for example, a case in which the control section 61 controls charge and discharge at the time of abnormal heat generation or a case in which the control section 61 performs a correction processing at the time of calculating a remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage measurement section 66.

The switch control section 67 executes control so that a charging current is prevented from flowing in a current path of the electric power source 62 by disconnecting the switch section 63 (charge control switch) in the case where, for example, a battery voltage reaches an overcharge detection voltage. Thereby, in the electric power source 62, only discharge is allowed to be performed through the discharging diode. It is to be noted that, for example, in the case where a large current flows at the time of charge, the switch control section 67 blocks the charging current.

Further, the switch control section 67 executes control so that a discharging current is prevented from flowing in the current path of the electric power source 62 by disconnecting the switch section 63 (discharge control switch) in the case where, for example, a battery voltage reaches an overdischarge detection voltage. Thereby, in the electric power source 62, only charge is allowed to be performed through the charging diode. It is to be noted that, for example, in the case where a large current flows at the time of discharge, the switch control section 67 blocks the discharging current.

It is to be noted that, in the secondary battery, for example, the overcharge detection voltage may be 4.20 V±0.05 V, and the over-discharge detection voltage may be 2.4 V±0.1 V.

The memory 68 may be, for example, an EEPROM as a nonvolatile memory or the like. The memory 68 may store, for example, numerical values calculated by the control section 61 and information of the secondary battery measured in a manufacturing step (such as an internal resistance in the initial state). It is to be noted that, in the case where the memory 68 stores a full charge capacity of the secondary battery, the control section 61 is allowed to comprehend information such as a remaining capacity.

The temperature detection device 69 measures temperature of the electric power source 62, and outputs the measurement result to the control section 61. The temperature detection device 69 may be, for example, a thermistor or the like.

The cathode terminal 71 and the anode terminal 72 are terminals connected to an external device (such as a notebook personal computer) driven using the battery pack or an external device (such as a battery charger) used for charging the battery pack. The electric power source 62 is charged and discharged through the cathode terminal 71 and the anode terminal 72.

[2-2. Electric Vehicle]

Figure 5:
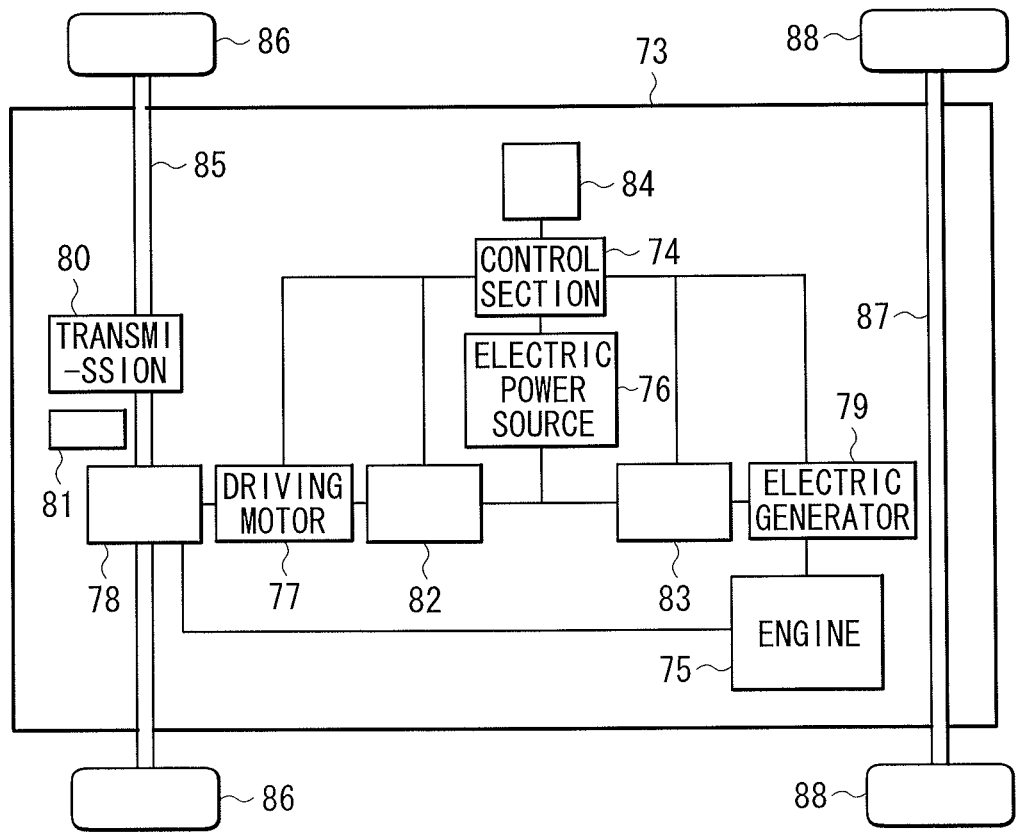
FIG. 5 is a block diagram illustrating a configuration of an application example (electric vehicle) of the secondary battery.

FIG. 5 illustrates a block configuration of a hybrid automobile as an example of electric vehicles. For example, the electric vehicle may include a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front drive shaft 85 and a front tire 86 that are connected to the differential 78 and the transmission 80, a rear drive shaft 87, and a rear tire 88.

The electric vehicle is runnable by using one of the engine 75 and the motor 77 as a drive source. The engine 75 is a main power source, and may be, for example, a petrol engine. In the case where the engine 75 is used as a power source, drive power (torque) of the engine 75 may be transferred to the front tire 86 or the rear tire 88 through the differential 78, the transmission 80, and the clutch 81 as drive sections, for example. The torque of the engine 75 may also be transferred to the electric generator 79. Due to the torque, the electric generator 79 generates alternating-current electric power. The alternating-current electric power is converted into direct-current electric power through the inverter 83, and the converted power is stored in the electric power source 76. On the other hand, in the case where the motor 77 as a conversion section is used as a power source, electric power (direct-current electric power) supplied from the electric power source 76 is converted into alternating-current electric power through the inverter 82. The motor 77 may be driven by the alternating-current electric power. Drive power (torque) obtained by converting the electric power by the motor 77 is transferred to the front tire 86 or the rear tire 88 through the differential 78, the transmission 80, and the clutch 81 as the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by the torque. It is preferable that the alternating-current electric power be converted to direct-current electric power through the inverter 82, and the direct-current regenerative electric power be stored in the electric power source 76.

The control section 74 controls operations of the whole electric vehicle, and, for example, may include a CPU and/or the like. The electric power source 76 includes one or more secondary batteries (not illustrated). Alternatively, the electric power source 76 may be connected to an external electric power source, and electric power may be stored by receiving the electric power from the external electric power source. The various sensors 84 may be used, for example, for controlling the number of revolutions of the engine 75 or for controlling opening level (throttle opening level) of an unillustrated throttle valve. The various sensors 84 may include, for example, a speed sensor, an acceleration sensor, an engine frequency sensor, and/or the like.

The description has been given above of the hybrid automobile as an electric vehicle. However, examples of the electric vehicles may include a vehicle (electric automobile) working with the use of only the electric power source 76 and the motor 77 without using the engine 75.

[2-3. Electric Power Storage System]

Figure 6:
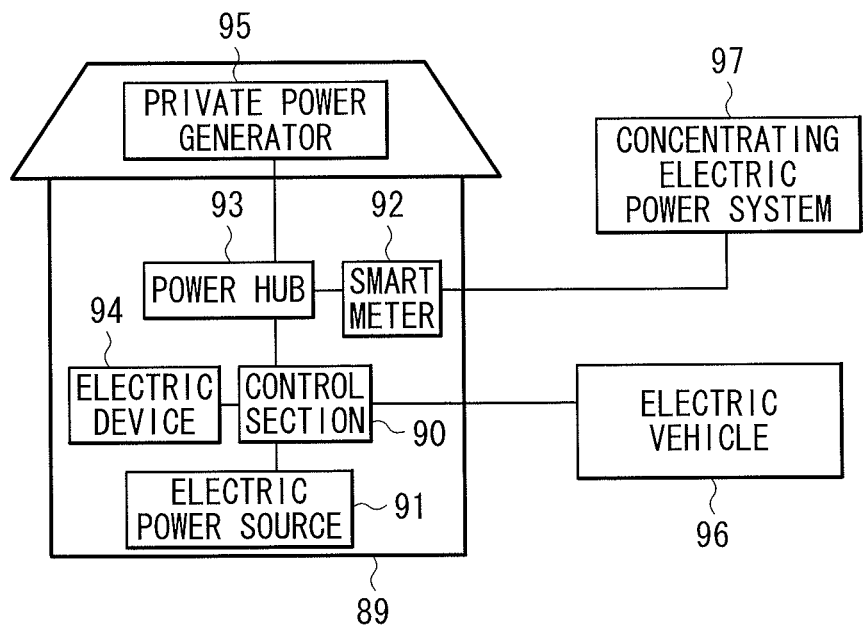
FIG. 6 is a block diagram illustrating a configuration of an application example (electric power storage system) of the secondary battery.

FIG. 6 illustrates a block configuration of an electric power storage system. For example, the electric power storage system may include a control section 90, an electric power source 91, a smart meter 92, and a power hub 93 inside a house 89 such as a general residence and a commercial building.

In this case, the electric power source 91 may be connected to, for example, an electric device 94 arranged inside the house 89, and may be connected to an electric vehicle 96 parked outside the house 89. Further, for example, the electric power source 91 may be connected to a private power generator 95 arranged inside the house 89 through the power hub 93, and may be connected to an external concentrating electric power system 97 thorough the smart meter 92 and the power hub 93.

It is to be noted that the electric device 94 may include, for example, one or more home electric appliances such as a refrigerator, an air conditioner, a television, and a water heater. The private power generator 95 may be, for example, one or more of a solar power generator, a wind-power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind-power plant, and the like.

The control section 90 controls operation of the whole electric power storage system (including a used state of the electric power source 91), and, for example, may include a CPU and/or the like. The electric power source 91 includes one or more secondary batteries (not illustrated). The smart meter 92 may be, for example, an electric power meter compatible with a network arranged in the house 89 demanding electric power, and may be communicable with an electric power supplier. Accordingly, for example, while the smart meter 92 communicates with outside as necessary, the smart meter 92 controls the balance between supply and demand in the house 89 and allows effective and stable energy supply.

In the electric power storage system, for example, electric power may be stored in the electric power source 91 from the concentrating electric power system 97 as an external electric power source through the smart meter 92 and the power hub 93, and electric power may be stored in the electric power source 91 from the private power generator 95 as an independent electric power source through the power hub 93. As necessary, the electric power stored in the electric power source 91 is supplied to the electric device 94 or to the electric vehicle 96 according to an instruction of the control section 90. Therefore, the electric device 94 becomes operable, and the electric vehicle 96 becomes chargeable. That is, the electric power storage system is a system capable of storing and supplying electric power in the house 89 with the use of the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

The foregoing electric power storage system may be arranged for each household (family unit), or may be arranged for a plurality of households (family units).

[2-4. Electric Power Tool]

Figure 7:
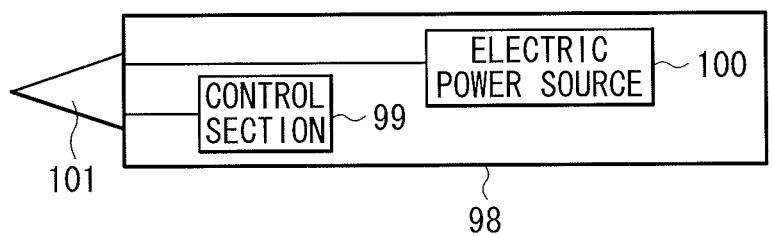
FIG. 7 is a block diagram illustrating a configuration of an application example (electric power tool) of the secondary battery.

FIG. 7 illustrates a block configuration of an electric power tool. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including a used state of the electric power source 100), and may include, for example, a CPU and/or the like. The electric power source 100 includes one or more secondary batteries (not illustrated). The control section 99 allows electric power to be supplied from the electric power source 100 to the drill section 101 as necessary according to operation of an unillustrated operation switch to operate the drill section 101.

EXAMPLES

Specific examples of the embodiment of the present application will be described in detail.

Examples 1 to 13

In order to simply examine adhesibility of the adhesion layer 17 with respect to the anode 14 and the electrolyte layer 16 illustrated in FIG. 3, adhesibility of a adhesion-use polymer compound with respect to a electrolyte-use polymer compound and a binding-use polymer compound was examined by the following procedure.

First, the adhesibility of the adhesion-use polymer compound with respect to the electrolyte-use polymer compound was examined. In this case, first, a film of the adhesion-use polymer compound (thickness: 50 μm) was prepared. Types and molecular weights (weight-average molecular weights) of the adhesion-use polymer compound were as illustrated in Table 1.

More specifically, "PVDF" refers to polyvinylidene fluoride (homopolymer). "PAA" refers to polyacrylic acid (homopolymer). "A copolymer (VDF+MMA)" refers to a copolymer of vinylidene fluoride (VDF) and monomethylmaleic anhydride (MMA), and the induction amount (copolymerization amount) of MMA is 0.3% (Example 1) and 1% (Examples 2 and 3). "A mixture (PVDF+PAA)" refers to a mixture of PVDF and PAA, and the mixture ratio is PVDF:PAA=1:1 at a weight ratio. "A copolymer (ET+MMA)" refers to a copolymer of ethylene (ET) and MMA. "A copolymer (VDF+VDFC1)" refers to a copolymer of VDF and 1-chloro-1-fluoroethylene (VDFC1). It is to be noted that Table 1 also illustrates types of polymer chains of the respective adhesion-use polymer compounds.

Subsequently, an electrolyte salt ($LiPF_6$) was dissolved in a mixed solvent (ethylene carbonate (EC) and propylene carbonate (PC)) to prepare an electrolytic solution. Thereafter, the electrolytic solution and the electrolyte-use polymer compound were mixed to prepare a precursor solution. In this case, the composition of the mixed solvent was EC:PC=1:1 at a weight ratio, and the content of the electrolyte salt with respect to the solvent was 1 mol/kg. Further, the mixture ratio between the electrolytic solution and the electrolyte-use polymer compound was 45:4 at a weight ratio. It is to be noted that, as the electrolyte-use polymer compound, a copolymer of VDF and hexafluoropropylene (HFP) including $(-CH_2-CF_2-)_n$ as a polymer chain was used.

Subsequently, the precursor solution was diluted with dimethyl carbonate (DMC), and the resultant was heated to obtain a state of sol. Thereafter, the surface of the film of the adhesion-use polymer compound was coated with the precursor solution, and subsequently, DMC was dried (at 80 deg C. for 5 minutes) to form the gel electrolyte layer 16.

Finally, the electrolyte layer 16 was left until temperature became ambient temperature (23 deg C.). Thereafter, whether or not the electrolyte layer 16 was peeled off from the film of the adhesion-use polymer compound was examined. Accordingly, results (adhesibility: gel) illustrated in Table 1 were obtained. A case that the electrolyte layer 16 was not peeled off although trial was made to artificially peel off the electrolyte layer 16 was rated as "good," and a case that the electrolyte layer 16 was peeled off was rated as "poor."

Next, the adhesibility of the adhesion-use polymer compound with respect to the binding-use polymer compound was examined. In this case, first, a film of the binding-use polymer compound (thickness: 50 μm) was prepared. Types of the binding-use polymer compound are, as illustrated in Table 1, polyimide (PI) or aramid (AR) each including a carbonyl group (>C=O) as a polar group. Table 1 also illustrates types of polar groups of the respective adhesion-use polymer compounds.

Subsequently, the adhesion-use polymer compound illustrated in Table 1 was dispersed in an organic solvent (N-methyl-2-pyrrolidone (NMP)) to prepare a process solution. In this case, the concentration of the adhesion-use polymer compound was 10 wt %.

Subsequently, the surface of the film of the binding-use polymer compound was coated with the process solution, and subsequently, a coat of the adhesion-use polymer compound was formed.

Finally, whether or not the coat of the adhesion-use polymer compound was peeled off from the film of the binding-use polymer compound (adhesibility) was examined. Accordingly, results (adhesibility: PI and AR) illustrated in Table 1 were obtained.

TABLE 1

Polymer chain of electrolyte-use polymer compound: $(-CH_2-CF_2-)_n$
Polar group of binding-use polymer compound: >C=O

| | Adhesion-use polymer compound | | | | Adhesibility | | |
|---|---|---|---|---|---|---|---|
| Example | Type | Molecular weight | Polymer chain | Polar group | Gel | PI | AR |
| 1 | Copolymer (VDF + MMA) | 1000000 | $(-CH_2-CF_2-)_n$ | —COOH | good | good | good |
| 2 | Copolymer | 280000 | $(-CH_2-CF_2-)_n$ | | good | good | good |

TABLE 1-continued

Polymer chain of electrolyte-use polymer compound: $(-CH_2-CF_2-)_n$
Polar group of binding-use polymer compound: $>C=O$

| Example | Type | Molecular weight | Polymer chain | Polar group | Gel | PI | AR |
|---|---|---|---|---|---|---|---|
| 3 | Copolymer (VDF + MMA) | 500000 | $(-CH_2-CF_2-)_n$ | | good | good | good |
| 4 | Mixture (VDF + MMA) | — | $(-CH_2-CF_2-)_n$ | —COOH | good | good | good |
| | (PVDF + PAA) | | | | | | |
| 5 | PAA | 25000 | $(-CH_2-CH(-COOH)-)_n$ | —COOH | poor | good | good |
| 6 | Copolymer (ET + MMA) | — | $(-CH_2-CH_2-)_n$ | —COOH | poor | good | good |
| 7 | PAA | 250000 | $(-CH_2-CH(-COOH)-)_n$ | —COOH | poor | good | good |
| 8 | PVDF | 280000 | $(-CH_2-CF_2-)_n$ | — | good | poor | poor |
| 9 | PVDF | 350000 | $(-CH_2-CF_2-)_n$ | — | good | poor | poor |
| 10 | PVDF | 500000 | $(-CH_2-CF_2-)_n$ | — | good | poor | poor |
| 11 | PVDF | 630000 | $(-CH_2-CF_2-)_n$ | — | good | poor | poor |
| 12 | PVDF | 280000 | $(-CH_2-CF_2-)_n$ | — | good | poor | poor |
| 13 | Copolymer (VDF + VDFCl) | 500000 | $(-CH_2-CF_2-)_n$ | — | good | poor | poor |

Header groupings: "Adhesion-use polymer compound" spans Type, Molecular weight, Polymer chain, Polar group. "Adhesibility" spans Gel, PI, AR.

First, attention is focused on the adhesibility of the adhesion-use polymer compound with respect to the electrolyte-use polymer compound. As is clear from the results of the adhesibility (gel), in the case where the polymer chain of the adhesion-use polymer compound was the same type as that of the polymer chain of the electrolyte-use polymer compound, the electrolyte layer 16 was not peeled off from the film of the adhesion-use polymer compound, differently from in the case where the polymer chain of the adhesion-use polymer compound was different from the polymer chain of the electrolyte-use polymer compound.

Further, attention is focused on the adhesibility of the adhesion-use polymer compound with respect to the binding-use polymer compound. As is clear from the results of the adhesibility (PI and AR), in the case where the adhesion-use polymer compound included a polar group as the binding-use polymer compound did, the coat of the adhesion-use polymer compound was not peeled off from the film of the binding-use polymer compound, differently from in the case where the adhesion-use polymer compound did not include such a polar group.

From the foregoing results, it was expected as follows. That is, in the case where a secondary battery was fabricated with the use of the foregoing binding-use polymer compound, the foregoing electrolyte-use polymer compound, and the foregoing adhesion-use polymer compound, the anode 14 was allowed to be rigidly adhered to the electrolyte layer 16 by utilizing the adhesion layer 17.

Examples 14 and 15

The laminated film-type lithium ion secondary battery illustrated in FIG. 1 to FIG. 3 was fabricated by the following procedure.

First, the cathode 13 was fabricated. In this case, lithium carbonate ($Li_2CO_3$) and cobalt carbonate ($CoCO_3$) were mixed at a molar ratio of $Li_2CO_3:CoCO_3=0.5:1$. Subsequently, the mixture was fired in the air at 900 deg C. for 5 hours. Thereby, lithium-cobalt composite oxide ($LiCoO_2$) was obtained. Subsequently, 91 parts by mass of a cathode active material ($LiCoO_2$), 3 parts by mass of a cathode binder (PVDF), and 6 parts by mass of a cathode electric conductor (graphite) were mixed to obtain a cathode mixture. Subsequently, the cathode mixture was dispersed in an organic solvent (NMP) to obtain paste cathode mixture slurry. Subsequently, both surfaces of the cathode current collector 13A in the shape of a strip (a strip-shaped aluminum foil being 20 μm thick) were coated with the cathode mixture slurry uniformly with the use of a coating device, which was dried to form the cathode active material layer 13B. Finally, the cathode active material layer 13B was compression-molded with the use of a roll pressing machine.

Next, the anode 14 was fabricated. In this case, 90 parts by mass of an anode active material (18 parts by mass of silicon monoxide and 72 parts by mass of graphite with the surface coated with amorphous carbon), 6 parts by mass of an NMP solution of polyamic acid (excluding a solvent), and 4 parts by mass of an anode binder (plate natural graphite) were mixed to obtain an anode mixture. Subsequently, the anode mixture was dispersed in an organic solvent (NMP) to obtain paste anode mixture slurry. Subsequently, both surfaces of the anode current collector 14A (a strip-shaped electrolytic copper foil being 15 μm thick) were coated with the anode mixture slurry uniformly with the use of a coating device, which was dried. Finally, the coating material was heated under vacuum (at 425 deg C. for 3 hours). Thereby, a binding-use polymer compound (polyimide) as an anode binder was created, and the anode active material layer 14B was formed.

Next, the adhesion layer 17 was formed. In this case, a copolymer of VDF and MMA (induction amount of MMA: 1%) as a adhesion-use polymer compound was dispersed in an organic solvent (NMP) to prepare a process solution. In this case, the concentration of the adhesion-use polymer compound was 0.2 wt %. Subsequently, the surface of the anode active material layer 14B was coated with the process solution, and subsequently, the resultant was dried in hot air (80 deg C.) and further dried under vacuum (200 deg C.). For comparison, the adhesion layer 17 was not formed as necessary.

Next, the electrolyte layer 16 was formed. In this case, EC and PC as solvents were mixed, and subsequently, an electrolyte salt ($LiPF_6$) was dissolved in the mixed solvent to prepare an electrolytic solution. In this case, the composition of the mixed solvent was EC:PC=1:1 at a weight ratio, and the content of the electrolyte salt with respect to the mixed solvent was 1 mol/kg. Subsequently, the electrolytic solution, a copolymer of vinylidene fluoride and hexafluoropropylene as a electrolyte-use polymer compound, and an organic solvent (DMC) were mixed to prepare a precursor solution. In this case, the mixture ratio was (the electrolytic solution):(the electrolyte-use polymer compound):(the organic solvent)=45:4:51 at a weight ratio. Subsequently, the precursor solution was heated to obtain a sol state, and thereafter, the respective surfaces of the cathode active material layer 13B and the adhesion layer 17 were coated with the precursor solution and the resultant was dried to form the gel electrolyte layer 16.

Finally, the secondary battery was assembled. In this case, the cathode lead 11 made of aluminum was welded to one end of the cathode current collector 13A, and the anode lead 12 made of nickel was welded to one end of the anode current collector 14A. Subsequently, the cathode 13 on which the electrolyte layer 16 was formed, the separator 15, the anode 14 on which the adhesion layer 17 and the electrolyte layer 16 were formed, and the separator 15 were laminated in this order, and the laminated body was spirally wound in the longitudinal direction. The separator 15 was a microporous polypropylene film being 25 μm thick. Thereafter, the winding end section of the spirally wound body was fixed with the use of the protective tape 18 (an adhesive tape) to form a precursor of the spirally wound electrode body 10. Subsequently, the precursor was sandwiched between the outer package members 20. Thereafter, the outermost peripheries except for one side were thermally fusion-bonded to contain the precursor in the pouch-like outer package member 20. The outer package member 20 was a laminated film (total thickness: 100 μm) having a three-layer structure in which a nylon film (thickness: 30 μm), an aluminum foil (thickness: 40 μm), and a non-stretched polypropylene film (thickness: 30 μm) were laminated from outside. Finally, the outer package member 20 in which the precursor was contained was compression-molded on heating (80 deg C.), and thereby, the cathode 13 and the anode 14 became in contact with the electrolyte layer 16. Thereby, the secondary battery was completed. It is to be noted that, upon fabricating the secondary battery, the thickness of the cathode active material layer 13B was adjusted so that lithium metal was not precipitated on the anode 14 at the time of full charge.

The secondary battery was disassembled, and the anode 14, the electrolyte layer 16, and the like were taken out. Thereafter, whether or not the anode 14 was peeled off from the electrolyte layer 16 (adhesibility) was examined, and cycle characteristics of the secondary battery were examined. Accordingly, results illustrated in Table 2 were obtained.

Upon examining the cycle characteristics, one cycle of charge and discharge was performed on the secondary battery in the ambient temperature environment (23 deg C.), and a discharge capacity was measured. Thereafter, the secondary battery was repeatedly charged and discharged until the total number of cycles reached 200 in the same environment, and a discharge capacity was measured. From these results, capacity retention ratio (%)=(discharge capacity at the 200th cycle/discharge capacity at the first cycle)× 100 was calculated. At the time of charge, charge was performed at a constant current of 0.7 C until the upper voltage reached 4.2 V, and thereafter, charge was performed at a constant voltage of 4.2 V until the current reached 0.07 C. At the time of discharge, discharge was performed at a constant current of 0.5 C until the voltage reached the final voltage of 3.0 V. It is to be noted that "0.7 C," "0.07 C," and "0.5 C" are respectively current values at which the respective battery capacities (theoretical capacities) are fully discharged in 10/7 hours, 100/7 hours, and 2 hours.

TABLE 2

| Example | Adhesion layer | Adhesibility | Capacity retention ratio (%) |
|---------|----------------|--------------|------------------------------|
| 14 | Present | good | 65 |
| 15 | Absent | poor | 55 |

In the case where the adhesion layer 17 was not inserted between the anode 14 and the electrolyte layer 16, the anode 14 was easily peeled off from the electrolyte layer 16. In contrast, in the case where the adhesion layer 17 was inserted between the anode 14 and the electrolyte layer 16, the anode 14 was not peeled off from the electrolyte layer 16. The result shows that the anode 14 is rigidly in contact with the electrolyte layer 16 with the adhesion layer 17 in between, and corresponds with the results illustrated in Table 1.

Further, in association with presence or absence of the foregoing peeling-off state, in the case where the adhesion layer 17 was inserted between the anode 14 and the electrolyte layer 16, the capacity retention ratio was increased compared to in the case where the adhesion layer 17 was not inserted between the anode 14 and the electrolyte layer 16.

The present application has been described with reference to the embodiment and Examples. However, the present application is not limited to the examples described in the embodiment and Examples, and various modifications may be made. For example, the electrode according to the present application may be applied to other applications such as a capacitor.

Further, for example, the description has been given with the specific example of the case in which the battery structure is the laminated film type, and the battery device has the spirally wound structure. However, applicable structures are not limited thereto. The secondary battery of the present application is similarly applicable to a battery having other battery structure such as a cylindrical-type battery, a square-type battery, a coin-type battery, and a button-type battery, or a battery in which the battery device has other structure such as a laminated structure.

Further, the description has been given of the case in which Li is used as an electrode reactant. However, the electrode reactant is not necessarily limited thereto. As an electrode reactant, for example, other Group 1 element such as Na and K, a Group 2 element such as Mg and Ca, or other light metal such as Al may be used. The effect of the present application may be obtained without depending on the electrode reactant type, and therefore, even if the electrode reactant type is changed, a similar effect is obtainable.

It is possible to achieve at least the following configurations from the above-described example embodiment of the disclosure.

(1) A secondary battery including:
a cathode and an anode opposed to each other with a separator in between;
an electrolyte layer provided between the anode and the separator; and
an adhesion layer provided between the anode and the electrolyte layer, wherein
the anode includes an active material and a first polymer compound, the electrolyte layer includes an electrolytic solution and a second polymer compound, the adhesion layer includes a third polymer compound, the first polymer compound includes a polar group, the second polymer compound includes a polymer chain, and the third polymer compound includes a polar group and a polymer chain same as the polymer chain of the second polymer compound.

(2) The secondary battery according (1), wherein the polar group of the first polymer compound and the polar group of the third polymer compound include one or both of oxygen (O) and nitrogen (N) as constituent elements, and the polymer chain of the second polymer compound and the polymer chain of the third polymer compound include a halogenated alkylene group.

(3) The secondary battery according to (1) or (2), wherein each of the polar groups includes one or more of a carboxyl group (—COOH), a hydroxyl group (—OH), an amino group (—NH$_2$), a nitro group (—NO$_2$), a cyano group (—CN), and a carbonyl group (—C(=O)—), and the polymer chain of the second polymer compound and the polymer chain of the third polymer compound include a difluoro ethylene group (—CH$_2$—CF$_2$—).

(4) The secondary battery according to any one of (1) to (3), wherein the first polymer compound includes one or more of polyimide, polyamide, polyamideimide, polyacrylic acid, and carboxymethylcellulose, the second polymer compound includes one or more of polyvinylidene fluoride and a copolymer including vinylidene fluoride as a monomer unit, and the third polymer compound includes a copolymer of maleate and vinylidene fluoride, or includes a mixture of polyvinylidene fluoride and polyacrylic acid.

(5) The secondary battery according to any one of (1) to (4), wherein the active material includes one or both of silicon (Si) and tin (Sn) as constituent elements.

(6) The secondary battery according to any one of (1) to (5), wherein the secondary battery is a lithium ion secondary battery.

(7) A battery pack including:

a secondary battery;

a control section controlling a used state of the secondary battery; and a switch section switching the used state of the secondary battery according to an instruction of the control section, wherein the secondary battery includes a cathode and an anode opposed to each other with a separator in between, an electrolyte layer provided between the anode and the separator, and an adhesion layer provided between the anode and the electrolyte layer, and wherein the anode includes an active material and a first polymer compound, the electrolyte layer includes an electrolytic solution and a second polymer compound, the adhesion layer includes a third polymer compound, the first polymer compound includes a polar group, the second polymer compound includes a polymer chain, and the third polymer compound includes a polar group and a polymer chain same as the polymer chain of the second polymer compound.

(8) An electric vehicle including:

a secondary battery;

a conversion section converting electric power supplied from the secondary battery into drive power;

a drive section operating according to the drive power; and a control section controlling a used state of the secondary battery, wherein the secondary battery includes a cathode and an anode opposed to each other with a separator in between, an electrolyte layer provided between the anode and the separator, and an adhesion layer provided between the anode and the electrolyte layer, and wherein the anode includes an active material and a first polymer compound, the electrolyte layer includes an electrolytic solution and a second polymer compound, the adhesion layer includes a third polymer compound, the first polymer compound includes a polar group, the second polymer compound includes a polymer chain, and the third polymer compound includes a polar group and a polymer chain same as the polymer chain of the second polymer compound.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery, comprising:
   a cathode and an anode opposed to each other with a separator in between;
   an electrolyte layer provided between the anode and the separator; and
   an adhesion layer provided between the anode and the electrolyte layer, wherein:
   the anode includes an active material and a first polymer compound,
   the active material of the anode includes at least one of SnSiO$_3$, LiSnO, or Mg$_2$Sn,
   the first polymer compound comprises an engineering plastic, which includes a first polar group,
   the engineering plastic included in the first polymer compound suppresses expansion and shrinkage of the active material of the anode during charge and discharge of the secondary battery,
   the electrolyte layer includes an electrolytic solution and a second polymer compound,
   the second polymer compound includes a first polymer chain,
   the adhesion layer includes a third polymer compound,
   the third polymer compound includes a second polar group and a second polymer chain,
   a chemical structure of the second polymer chain is same as a chemical structure of the first polymer chain,
   swelling characteristics of the first polymer chain is suppressed by the second polar group, in a range of operational temperature of the secondary battery, and
   adhesion between the anode and the adhesion layer is based on the suppression of the swelling characteristics of the first polymer chain and interaction between the first polar group and the second polar group.

2. The secondary battery according to claim 1, wherein: the first polymer chain includes a halogenated alkylene group.

3. The secondary battery according to claim 1, wherein: each of the first polar group and the second polar group includes at least one of a hydroxyl group (—OH), an amino group (—$NH_2$), a nitro group (—$NO_2$), a carboxyl group (—COOH), a cyano group (—CN), or a carbonyl group (—C(=O)—), and the first polymer chain includes a difluoro ethylene group (—$CH_2$—$CF_2$—).

4. The secondary battery according to claim 3, wherein: the second polymer compound includes at least one of polyvinylidene fluoride or a copolymer that includes vinylidene fluoride as a monomer unit, and the third polymer compound includes a copolymer of maleate and vinylidene fluoride or a mixture of polyvinylidene fluoride and polyacrylic acid.

5. The secondary battery according to claim 1, wherein the secondary battery is a lithium ion secondary battery.

6. The secondary battery according to claim 1, wherein the first polar group and the second polar group are a same polar group.

7. The secondary battery according to claim 1, wherein the adhesion layer is in contact with the anode on a first surface and is in contact with the electrolyte layer on a second surface opposite the first surface.

8. The secondary battery according to claim 1, wherein the electrolyte layer is a gel electrolyte layer, and the adhesion layer is in contact with the gel electrolyte layer.

9. A battery pack, comprising:
a secondary battery;
a control section configured to control a used state of the secondary battery; and
a switch section configured to switch the used state of the secondary battery according to an instruction of the control section, wherein:
the secondary battery includes:
  a cathode and an anode opposed to each other with a separator in between,
  an electrolyte layer provided between the anode and the separator, and
  an adhesion layer provided between the anode and the electrolyte layer, wherein:
    the anode includes an active material and a first polymer compound,
    the active material of the anode includes at least one of $SnSiO_3$, LiSnO, or $Mg_2Sn$,
    the first polymer compound comprises an engineering plastic, which includes a first polar group,
    the engineering plastic included in the first polymer compound suppresses expansion and shrinkage of the active material of the anode during charge and discharge of the secondary battery,
    the electrolyte layer includes an electrolytic solution and a second polymer compound,
    the second polymer compound includes a first polymer chain,
    the adhesion layer includes a third polymer compound,
    the third polymer compound includes a second polar group and a second polymer chain,
    a chemical structure of the second polymer chain is same as a chemical structure of the first polymer chain,
    swelling characteristics of the first polymer chain is suppressed by the second polar group, in a range of operational temperature of the secondary battery, and
    adhesion between the anode and the adhesion layer is based on the suppression of the swelling characteristics of the first polymer chain and interaction between the first polar group and the second polar group.

10. An electric vehicle, comprising:
a secondary battery;
a conversion section configured to convert electric power supplied from the secondary battery into drive power;
a drive section configured to operate in accordance with the drive power; and
a control section configured to control a used state of the secondary battery, wherein:
the secondary battery includes:
  a cathode and an anode opposed to each other with a separator in between,
  an electrolyte layer provided between the anode and the separator, and
  an adhesion layer provided between the anode and the electrolyte layer, wherein:
    the anode includes an active material and a first polymer compound,
    the active material of the anode includes at least one of $SnSiO_3$, LiSnO, or $Mg_2Sn$,
    the first polymer compound comprises an engineering plastic, which includes a first polar group,
    the engineering plastic included in the first polymer compound suppresses expansion and shrinkage of the active material of the anode during charge and discharge of the secondary battery,
    the electrolyte layer includes an electrolytic solution and a second polymer compound,
    the second polymer compound includes a first polymer chain,
    the adhesion layer includes a third polymer compound,
    the third polymer compound includes a second polar group and a second polymer chain,
    a chemical structure of the second polymer chain is same as a chemical structure of the first polymer chain, swelling characteristics of the first polymer chain is suppressed by the second polar group, in a range of operational temperature of the secondary battery, and
    adhesion between the anode and the adhesion layer is based on the suppression of the swelling characteristics of the first polymer chain and interaction between the first polar group and the second polar group.

* * * * *